United States Patent
Honda

(10) Patent No.: US 11,780,277 B2
(45) Date of Patent: Oct. 10, 2023

(54) TIRE MOUNTING POSITION DETECTION SYSTEM, TIRE MOUNTING POSITION DETECTION METHOD, AND TIRE MOUNTING POSITION DETECTION PROGRAM

(71) Applicant: BRIDGESTONE CORPORATION, Tokyo (JP)

(72) Inventor: Kyohei Honda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 530 days.

(21) Appl. No.: 16/972,204

(22) PCT Filed: May 21, 2019

(86) PCT No.: PCT/JP2019/020133
§ 371 (c)(1),
(2) Date: Dec. 4, 2020

(87) PCT Pub. No.: WO2019/235213
PCT Pub. Date: Dec. 12, 2019

(65) Prior Publication Data
US 2021/0229507 A1  Jul. 29, 2021

(30) Foreign Application Priority Data

Jun. 7, 2018  (JP) .................................. 2018-109293

(51) Int. Cl.
*B60C 23/00* (2006.01)
*B60C 23/04* (2006.01)
*G01S 5/02* (2010.01)

(52) U.S. Cl.
CPC ...... *B60C 23/0416* (2013.01); *B60C 23/0437* (2013.01); *B60C 23/0444* (2013.01); *G01S 5/0226* (2013.01); *G01S 5/0269* (2020.05)

(58) Field of Classification Search
CPC ............ B60C 23/0416; B60C 23/0437; B60C 23/0444; B60C 23/007; B60C 23/008;
(Continued)

(56) References Cited

U.S. PATENT DOCUMENTS

2003/0197603 A1  10/2003  Stewart et al.
2007/0090970 A1*  4/2007  Watabe .............. B60C 23/0462
340/901
(Continued)

FOREIGN PATENT DOCUMENTS

JP  2005-178522 A  7/2005
JP  2007-045201 A  2/2007
(Continued)

OTHER PUBLICATIONS

International search report for PCT/JP2019/020133 dated Jul. 16, 2019.
(Continued)

*Primary Examiner* — Ojiako K Nwugo
(74) *Attorney, Agent, or Firm* — Sughrue Mion, PLLC

(57) ABSTRACT

A tire mounting position detection system measures a first signal strength which is the strength of a radio signal received by a first receiver (R1) for each transmitter, measures a second signal strength which is the strength of the radio signal received by a second receiver (R2) for each transmitter, and calculates an strength ratio which is a ratio using the first signal strength and the second signal strength for each transmitter. The tire mounting position detection system detects a wheel position where a tire equipped with a transmitter is mounted on the basis of the first signal strength, the second signal strength and a strength ratio for each transmitter.

13 Claims, 9 Drawing Sheets

(58) Field of Classification Search
CPC ... G01S 5/0226; G01S 2205/01; G01S 5/0284
See application file for complete search history.

(56) References Cited

U.S. PATENT DOCUMENTS

| | | | | |
|---|---|---|---|---|
| 2008/0074248 | A1* | 3/2008 | Mori | B60C 23/0416 |
| | | | | 340/438 |
| 2009/0002146 | A1 | 1/2009 | Lin | |
| 2012/0244877 | A1* | 9/2012 | Margalef | G08C 17/02 |
| | | | | 455/456.1 |
| 2013/0321139 | A1 | 12/2013 | Li et al. | |
| 2019/0152277 | A1* | 5/2019 | Hassani | B60C 23/0437 |
| 2019/0230615 | A1* | 7/2019 | Werner | B60C 23/0408 |
| 2019/0232733 | A1* | 8/2019 | Patel | B60C 23/0461 |
| 2019/0241029 | A1* | 8/2019 | Li | B60C 23/044 |
| 2019/0329605 | A1* | 10/2019 | Fischer | B60C 23/0489 |
| 2021/0268849 | A1* | 9/2021 | Kretschmann | B60C 23/0479 |
| 2022/0388353 | A1* | 12/2022 | Lee | B60C 23/0437 |

FOREIGN PATENT DOCUMENTS

| | | |
|---|---|---|
| JP | 2013-001219 A | 1/2013 |
| JP | 2016-111544 A | 6/2016 |
| JP | 2016-117991 A | 6/2016 |

OTHER PUBLICATIONS

Extended European Search Report dated Oct. 21, 2021 from the European Patent Office in EP Application No. 19814949.4.

* cited by examiner

|   | R1  | R2  | R1/R2 | POSITION |
|---|-----|-----|-------|----------|
| a | 109 | 100 | 1.088 | 1 |
| b | 114 | 91  | 1.258 | 2 |
| c | 101 | 111 | 0.911 | 3 |
| d | 106 | 113 | 0.943 | 4 |
| e | 113 | 108 | 1.048 | 5 |
| f | 113 | 107 | 1.053 | 6 |

FIG. 8

|   | R1 | R2 | R1+R2 | R1/R2 | POSITION |
|---|------|------|-------|-------|----------|
| a | 90.0 | 69.8 | 159.9 | 1.29  | 1        |
| b | 85.6 | 67.8 | 153.4 | 1.26  | 2        |
| c | 96.5 | 74.7 | 171.1 | 1.29  | 3        |
| d | 89.6 | 79.6 | 169.2 | 1.13  | 4        |
| e | 79.6 | 90.2 | 169.8 | 0.88  | 5        |
| f | 72.9 | 92.4 | 165.4 | 0.79  | 6        |
| g | 72.4 | 95.2 | 167.6 | 0.76  | 7        |
| h | 70.0 | 91.1 | 161.1 | 0.77  | 8        |
| i | 67.9 | 78.6 | 146.5 | 0.86  | 9        |
| j | 70.4 | 86.0 | 156.4 | 0.82  | 10       |
| k | 68.4 | 87.3 | 155.8 | 0.78  | 11       |
| l | 66.7 | 90.2 | 156.9 | 0.74  | 12       |

FIG. 9

|   | R1 | R2 | R1+R2 | R1/R2 |
|---|------|------|-------|-------|
| a | 90.0 | 69.8 | 159.9 | 1.29  |
| b | 85.6 | 67.8 | 153.4 | 1.26  |
| c | 96.5 | 74.7 | 171.1 | 1.29  |
| d | 89.6 | 79.6 | 169.2 | 1.13  |
| e | 79.6 | 90.2 | 169.8 | 0.88  |
| f | 72.9 | 92.4 | 165.4 | 0.79  |
| g | 72.4 | 95.2 | 167.6 | 0.76  |
| h | 70.0 | 91.1 | 161.1 | 0.77  |
| i | 67.9 | 78.6 | 146.5 | 0.86  |
| j | 70.4 | 86.0 | 156.4 | 0.82  |
| k | 68.4 | 87.3 | 155.8 | 0.78  |
| l | 66.7 | 90.2 | 156.9 | 0.74  |

FIG. 10

|   | R1   | R2   | R1+R2 | R1/R2 |
|---|------|------|-------|-------|
| a | 90.0 | 69.8 | 159.9 | 1.29  |
| b | 85.6 | 67.8 | 153.4 | 1.26  |
| c | 96.5 | 74.7 | 171.1 | 1.29  |
| d | 89.6 | 79.6 | 169.2 | 1.13  |
| e | 79.6 | 90.2 | 169.8 | 0.88  |
| f | 72.9 | 92.4 | 165.4 | 0.79  |
| g | 72.4 | 95.2 | 167.6 | 0.76  |
| h | 70.0 | 91.1 | 161.1 | 0.77  |
| i | 67.9 | 78.6 | 146.5 | 0.86  |
| j | 70.4 | 86.0 | 156.4 | 0.82  |
| k | 68.4 | 87.3 | 155.8 | 0.78  |
| l | 66.7 | 90.2 | 156.9 | 0.74  |

FIG. 11

|   | R1   | R2   | R1+R2 | R1/R2 |
|---|------|------|-------|-------|
| a | 90.0 | 69.8 | 159.9 | 1.29  |
| b | 85.6 | 67.8 | 153.4 | 1.26  |
| c | 96.5 | 74.7 | 171.1 | 1.29  |
| d | 89.6 | 79.6 | 169.2 | 1.13  |
| e | 79.6 | 90.2 | 169.8 | 0.88  |
| f | 72.9 | 92.4 | 165.4 | 0.79  |
| g | 72.4 | 95.2 | 167.6 | 0.76  |
| h | 70.0 | 91.1 | 161.1 | 0.77  |
| i | 67.9 | 78.6 | 146.5 | 0.86  |
| j | 70.4 | 86.0 | 156.4 | 0.82  |
| k | 68.4 | 87.3 | 155.8 | 0.78  |
| l | 66.7 | 90.2 | 156.9 | 0.74  |

FIG. 12

|   | R1 | R2 | R1+R2 | R1/R2 |
|---|---|---|---|---|
| a | 90.0 | 69.8 | 159.9 | 1.29 |
| b | 85.6 | 67.8 | 153.4 | 1.26 |
| c | 96.5 | 74.7 | 171.1 | 1.29 |
| d | 89.6 | 79.6 | 169.2 | 1.13 |
| e | 79.6 | 90.2 | 169.8 | 0.88 |
| f | 72.9 | 92.4 | 165.4 | 0.79 |
| g | 72.4 | 95.2 | 167.6 | 0.76 |
| h | 70.0 | 91.1 | 161.1 | 0.77 |
| i | 67.9 | 78.6 | 146.5 | 0.86 |
| j | 70.4 | 86.0 | 156.4 | 0.82 |
| k | 68.4 | 87.3 | 155.8 | 0.78 |
| l | 66.7 | 90.2 | 156.9 | 0.74 | ized subscript characters

TIRE MOUNTING POSITION DETECTION SYSTEM, TIRE MOUNTING POSITION DETECTION METHOD, AND TIRE MOUNTING POSITION DETECTION PROGRAM

CROSS-REFERENCE TO RELATED APPLICATIONS

This application is a National Stage of International Application No. PCT/JP2019/020133 filed May 21, 2019, which claims priority under U.S.C. § 119(a) to Japanese Patent Application No. 2018-109293 filed on Jun. 7, 2018.

TECHNICAL FIELD

The present invention relates to a tire mounting position detection system, a tire mounting position detection method and a tire mounting position detection program for detecting at which wheel position of a vehicle each tire equipped with a transmitter is mounted.

BACKGROUND ART

In order to measure the internal pressure and temperature of a tire (where the tire is mounted on a rim wheel) mounted on a vehicle, a sensor in the tire including a transmitter of a radio signal (radio wave) is widely provided.

The information detected by the sensor needs to be managed in association with the wheel position (Front right wheel, rear left wheel, etc.) of the vehicle on which the tire is mounted. However, since the wheel position to which the tire (Sensor) is mounted is changed by rotation or the like, it is necessary to update the correspondence between the identifier (ID) of the sensor and the wheel position each time.

Therefore, a method of automatically detecting the position of a wheel on which a tire (Sensor) is mounted is known in order to avoid such complication of updating. For example, in the tire air pressure monitoring system disclosed in Patent Literature 1, 2 receivers are disposed in the longitudinal direction of the vehicle, and a sensor provided in the tire for sensing the rotational direction of the tire is used to automatically detect the position of the wheel on which the tire (Sensor) is mounted.

CITATION LIST

Patent Literature

[PTL 1] Japanese Unexamined Patent Application Publication No. 2007-045201

SUMMARY OF INVENTION

However, in the above-described tire air pressure monitoring system, a sensor for additionally detecting the rotational direction is required in order to detect the position of a wheel on which a tire (Sensor) is mounted. Since the addition of such sensors may increase costs and system failure rates, the addition of additional sensors should be avoided if possible.

Further, since the strength (Transmit Power) of the radio signal transmitted by the transmitter varies individually, it is necessary to consider such variation in transmission power when automatically detecting the position of the wheel on which the tire (Sensor) is mounted. Furthermore, the receiver may have a low reception sensitivity, which may cause problems in that the reception level of a radio signal transmitted from a transmitter distant from the receiver cannot be correctly detected.

Accordingly, an object of the present invention is to provide a tire mounting position detection system, a tire mounting position detection method, and a tire mounting position detection program which can automatically detect the position of a wheel on which a tire (Sensor) is mounted on the basis of only the reception state of a radio signal transmitted from a transmitter, particularly, even when dispersion of transmission power or reception sensitivity of a receiver is low.

One aspect of the present invention is a tire mounting position detection system (For example, tire mounting position detection system 100) for detecting at which wheel position (1 to 6) of a vehicle (Vehicle 10) each tire (Tire 31 to 36) equipped with a transmitter (e.g., sensors 41 to 46) is mounted, including a receiving unit (Receiving Unit 105) disposed in the vehicle and for receiving a radio signal transmitted from the transmitter. The receiving unit includes a first receiver (Receiver 110) and a second receiver (Receiver 120) disposed at a position different from the first receiver in the vehicle longitudinal direction and the vehicle width direction. The tire mounting position detection system includes a first measurement unit (Frist measuring unit 210) for measuring a first signal strength ($R1(x)$), which is strength of the radio signal received by the first receiver, for each transmitter, a second measurement unit (Second measurement unit 220) for measuring a second signal strength ($R2(x)$), which is strength of the radio signal received by the second receiver, for each transmitter, a calculation unit (signal strength calculation unit 230) for calculating an strength ratio, which is a ratio using the first signal strength and the second signal strength, for each transmitter, and a position detection unit (position detection unit 250) for detecting a wheel position on which a tire equipped with the transmitter is mounted, based on the first signal strength, the second signal strength, and the strength ratio for each transmitter.

One aspect of the present invention is a tire mounting position detecting method for detecting at which wheel position of a vehicle each tire mounted with a transmitter is mounted, including a receiving unit is disposed in the vehicle and receives a radio signal transmitted from the transmitter. The receiving unit includes a first receiver and a second receiver disposed at a position different from the first receiver in the vehicle longitudinal direction and the vehicle width direction, and the tire mounting position detecting method includes the steps of measuring a first signal strength, which is the strength of the radio signal received by the first receiver, for each transmitter, measuring a second signal strength, which is the strength of the radio signal received by the second receiver, for each transmitter calculating an strength ratio, which is a ratio using the first signal strength and the second signal strength, for each transmitter, and detecting a position of a wheel on which a tire equipped with the transmitter is mounted, based on the first signal strength, the second signal strength, and the strength ratio for each transmitter.

One aspect of the present invention is a tire mounting position detection program for detecting at which wheel position of a vehicle each tire mounted with a transmitter is mounted, including a receiving unit is disposed in the vehicle and receives a radio signal transmitted from the transmitter. The receiving unit includes a first receiver and a second receiver disposed at a position different from the first receiver in the vehicle longitudinal direction and the vehicle width direction. The tire mounting position detection program causing a computer to execute a process of measuring a first signal strength, which is the strength of the radio signal received by the first receiver, for each transmitter, a process of measuring a second signal strength, which is the strength of the radio signal received by the second receiver, for each transmitter, a process of calculating an strength ratio, which is a ratio using the first signal strength and the second signal strength, for each transmitter, and a process of detecting a position of a wheel on which a tire equipped with the transmitter is mounted is mounted, based on the first signal strength, the second signal strength, and the strength ratio for each transmitter.

BRIEF DESCRIPTION OF DRAWINGS

FIG. 8 is a diagram illustrating an example of the strength and computational results of the radio signal measured by the tire mounting position detection system 100 A.

FIG. 9 is a diagram showing an example of the strength of the radio signal measured by the tire mounting position detection system 100 A and the calculation results (Processing up to step 280 is completed).

FIG. 10 is a diagram showing an example of the strength of the radio signal measured by the tire mounting position detection system 100 A and the calculation results (Processing up to step 310 is completed).

FIG. 11 is a diagram showing an example of the strength of the radio signal measured by the tire mounting position detection system 100 A and the calculation results (Processing up to step 340 is completed).

FIG. 12 is a diagram showing an example of the strength of the radio signal measured by the tire mounting position detection system 100 A and the calculation results (All the processes up to step 350 are completed).

DESCRIPTION OF EMBODIMENTS

Figure 1:
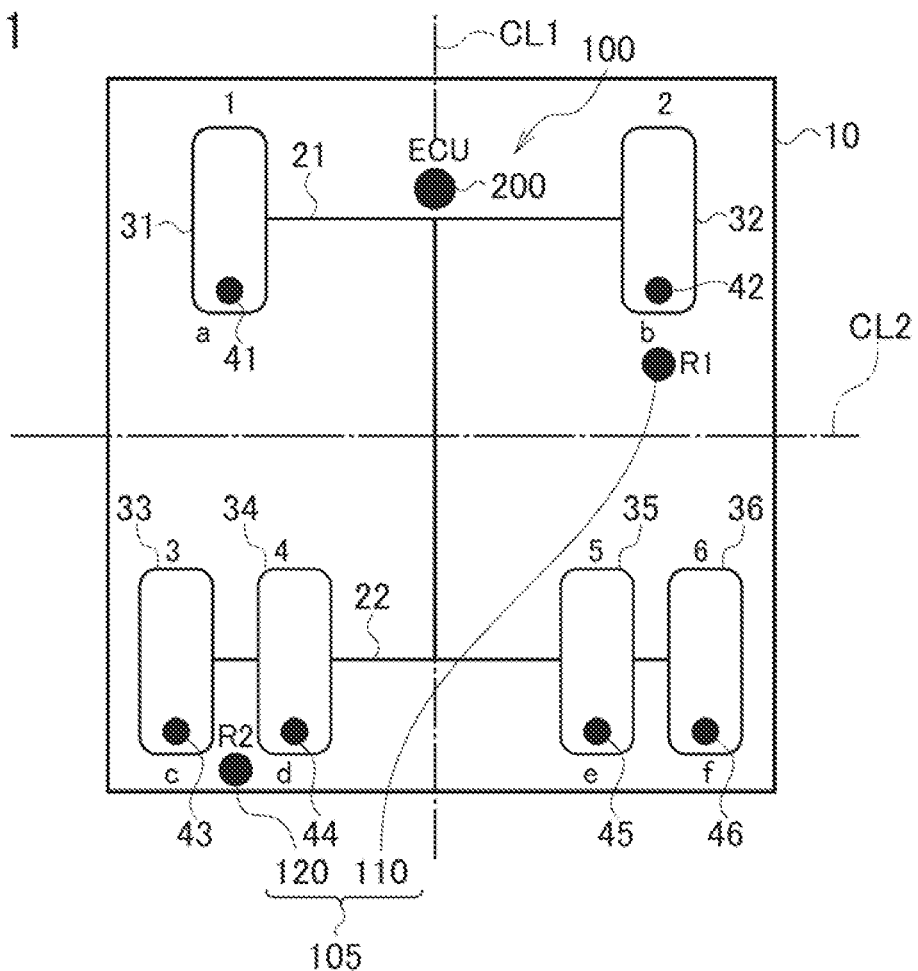
FIG. 1 is a schematic plan view of a vehicle 10 including a tire mounting position detection system 100.

Hereinafter, an embodiment will be described based on the drawings. It should be noted that the same or similar reference numerals are given to the same functions and configurations, and the description thereof will be omitted as appropriate.

First Embodiment (1) Schematic Structure of Vehicle Including the Tire Mounting Position Detection System FIG. 1 is a schematic plan view of a vehicle 10 including a tire mounting position detection system 100. As shown in FIG. 1, the vehicle 10 is an automobile having a front wheel axle 21 and a rear wheel axle 22. The type of the vehicle 10 is not particularly limited, but the rear wheel axle 22 has a so-called double tire configuration, and is mainly assumed to be a large vehicle such as a truck and a mining vehicle.

A vehicle 10 is mounted with tires 31 to 36. The tires 31 to 36 are tires (May be called a tire wheel assembly) assembled to a rim wheel.

Here, the tire 31 is mounted at the left front wheel position ("1" in the figure, and same as below). Similarly, the tires 32 to 36 are mounted at positions of a right front wheel (2), a left outside rear wheel (3), a left inside rear wheel (4), a right inside rear wheel (5), and a right outside rear wheel (6), respectively.

The tire 31 is equipped with a sensor 41 for measuring the internal pressure and temperature of the tire 31. The sensor 41 may include a sensor for measuring acceleration. Sensor 41 includes a transmitter for transmitting measured internal pressure and temperature data. Similarly, the tires 32 to 36 are equipped with sensors 42 to 46. The sensors 41 to 46 may be suitably used in a tire pressure monitoring system (TPMS) or the like.

To the sensor 41, "a" is assigned as a sensor ID which is an identification for identifying the sensor 41 (Transmitter). Similarly, sensors 42 to 46 are assigned "b" to "f" as sensor IDs, respectively.

A tire mounting position detection system 100 detects on which wheel position of the vehicle 10 each of tire 31 to a tire 36 equipped with the sensor 41 (Transmitter) to 46 is mounted ("1" to "6" in the figure).

The tire mounting position detection system 100 includes a receiving unit 105 and a position detection device 200. The receiving unit 105 is disposed in the vehicle 10 and receives radio signals (radio wave) transmitted from the sensors 41 (Transmitter) to 46.

In this embodiment, the receiving unit 105 includes a receiver 110 and a receiver 120. In the present embodiment, the receiver 110 constitutes a first receiver. The receiver 120 constitutes a 2nd receiver.

The receiver 110 is appropriately labeled "R1" for convenience. The receiver 110 receives radio signals transmitted from each sensor (Transmitter), i.e., the sensors 41 to 46. Note that the strength of the radio signal (Transmit Power), the frequency band used, and the like may vary depending on the area of use of the tire mounting position detection system 100 or the type of vehicle 10.

The receiver 120 is appropriately labeled "R2" for convenience. The receiver 120 also receives radio signals transmitted from the sensors 41 to 46. The receiver 120 is located at a different location from the receiver 110. Specifically, the receiver 120 is disposed at a position different from the receiver 110 in the vehicle longitudinal direction and the vehicle width direction.

In this embodiment, the receiver 110 is disposed on one side of the center line CL1 (Widthwise center line) between the left wheel (For example, "1") and the right wheel (For example, "2") as a reference, more specifically, on the right side of the center line CL1.

On the other hand, the receiver 120 is disposed on the other side of the center line CL1, more specifically, on the left side.

In the present embodiment, the receiver 110 is disposed on one side of the center line CL2 (longitudinal centerline)

between the front wheel ("1", "2") and the rear wheel ("3" to "6") as a reference, more specifically, on the front wheel side of the center line CL2.

On the other hand, the receiver 120 is disposed on the other side with respect to the center line CL2, specifically, on the rear wheel side.

The position detecting device 200 uses the receiving unit 105 to detect the tire 31 to the tire 36, that is, the position of the wheel ("1" to "6") on which the sensor 41 to the sensor 46 are equipped. In this embodiment, the position detecting device 200 is incorporated as a part of an electronic control unit (ECU) mounted on the vehicle 10. As will be described later, the function realized by the position detection device 200 may be provided outside the vehicle 10 (Cloud, etc.) connectable via a communication network.

(2) Function Block Configuration of Tire Mounting Position Detection System

Next, a functional block configuration of the tire mounting position detection system 100 will be described. Specifically, a functional block configuration of the position detecting device 200 constituting the tire mounting position detecting system 100 will be described.

Figure 2:
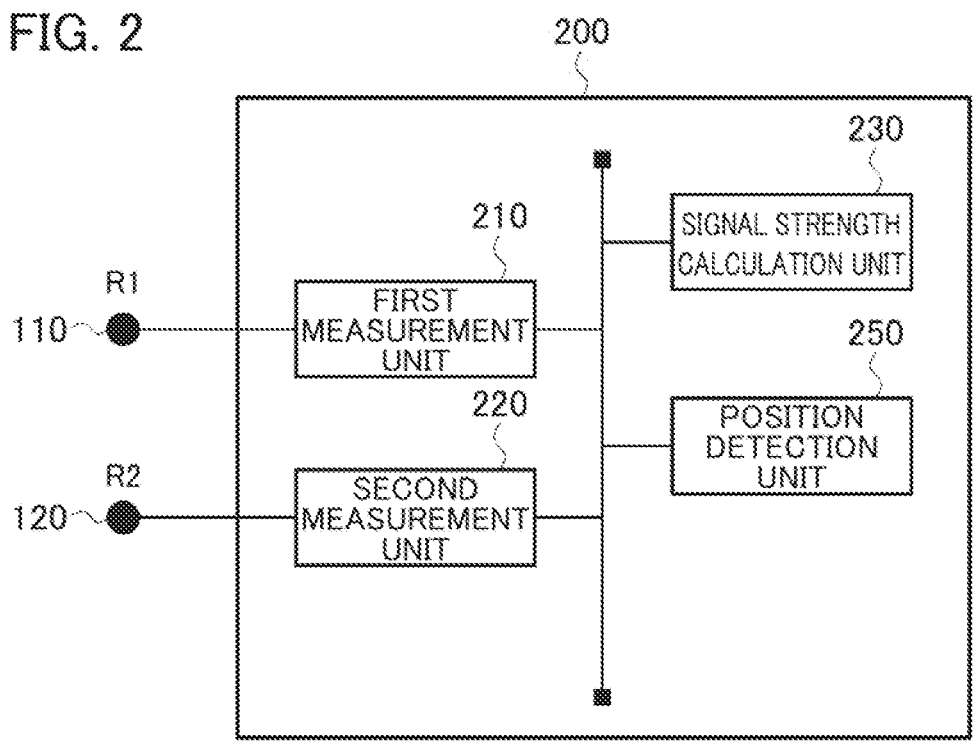
FIG. 2 is a functional block diagram of a position sensing device 200.

FIG. 2 is a functional block diagram of the position detection device 200. As shown in FIG. 2, the position detection device 200 includes a first measurement unit 210, a second measurement unit 220, a signal strength calculation unit 230, and a position detection unit 250.

The position detecting device 200 has hardware such as a CPU and a memory, and the above-mentioned respective functional parts are realized by executing a computer program (Software) on the hardware.

The first measuring unit 210 is connected to the receiver 110. The first measurement unit 210 measures the strength (first signal strength) of the radio signal received by the receiver 110 for each of the sensors 41 to 46 (Transmitter).

The second measurement unit 220 is connected to the receiver 120. The second measurement unit 220 measures the strength (second signal strength) of the radio signal received by the receiver 120 for each of the sensors 41 to 46 (Transmitter).

Hereinafter, a signal received by the receiver 110 (first receiver) from the sensor 41 (Sensor ID=a) is denoted by R1 (a). Similarly, a signal received by the receiver 120 (Receiver 120) from the sensor 41 (Sensor ID=a) is denoted by R2 (a) (The same applies to other sensors).

The strength of the radio signal to be measured by the first measurement unit 210 and the second measurement unit 220 may be a voltage level or a power level. Further, control may be performed in units of decibels (dB). In this embodiment, a voltage level (Units: V) is used.

In this embodiment, the radio signals transmitted from the sensors 41 to 46 (Transmitter) include a sensor ID (identifier) that identifies each sensor.

The signal strength calculation unit 230 executes a calculation using the strength of the radio signal measured by the first measurement unit 210 and the second measurement unit 220. Since the positions of the sensors in the longitudinal direction of the vehicle can be different depending on the rotation of the tire, it is preferable that the signal strength calculation unit 230 uses the average of the values measured a plurality of times.

The signal strength calculation unit 230 calculates a strength ratio which is a ratio using the strength (first signal strength) of the radio signal received by the receiver 110 and the strength (second signal strength) of the radio signal received by the receiver 120 for each sensor. In the present embodiment, the signal strength calculation unit 230 constitutes the calculation unit.

In the present embodiment, the signal strength calculation unit 230 calculates the quotient of the first signal strength and the second signal strength for each sensor as the strength ratio. Specifically, the signal strength calculation unit 230 divides the first signal strength by the second signal strength to calculate a quotient (R1/R2). More specifically, the signal strength calculation unit 230 calculates a quotient (R1/R2) of the following signal strengths.

$$R1(a)/R2(a)$$

$$R1(b)/R2(b)$$

$$R1(c)/R2(c)$$

$$R1(d)/R2(d)$$

$$R1(e)/R2(e)$$

$$R1(f)/R2(f) \qquad \text{[Formula 1]}$$

The strength ratio may be a ratio using the first signal strength and the second signal strength, and is not limited to R1/R2. The quotient may be R2/R1, or it may be such as (R1−R2)/(R1+R2) that the values of R1 and R2 can be made dimensionless.

The position detection unit 250 detects a wheel position where a tire equipped with a sensor (Transmitter) is mounted. Specifically, the position detection unit 250 detects the positions of the sensors 41 to 46 equipped with the tires 31 to 36 mounted on the wheels (Position).

The position detection unit 250 detects a wheel position where the tire equipped with the sensor is mounted on the basis of the first signal strength, the second signal strength and the strength ratio for each sensor.

Specifically, the position detection unit 250 determines a sensor close to the receiver 110 based on the signal strength R1 (x) ("x" is the sensor ID) for each sensor received by the receiver 110. Similarly, the position detection unit 250 determines a sensor close to the receiver 120 based on the signal strength R2 (x) of each sensor received by the receiver 120. Thus, the position detection unit 250 detects the front wheel position ("1", "2").

Further, the position detection unit 250 detects, based on the magnitude of the quotient (R1/R2) for each sensor, the position of the rear wheel ("3" to "6") in particular. That is, the position detection unit 250 detects the wheel position in the rear wheel axle based on the strength ratio such as quotient (R1/R2). A more specific method of detecting the wheel position will be described later.

(3) Operation of the Tire Mounting Position Detection System

Next, the operation of the tire mounting position detection system 100 will be described. Specifically, the initial setting operation of the tire mounting position detection system 100 and the tire (Sensor) position detection operation will be described.

(3.1) Initial Setup Operation

Figure 3:
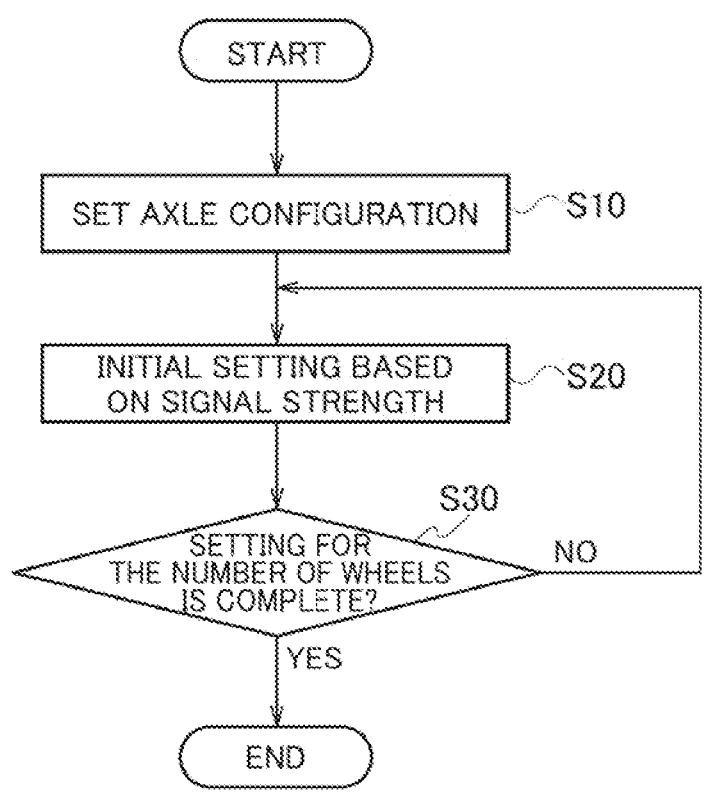
FIG. 3 is a diagram illustrating an initial setup operation flow of the tire mounting position detection system 100.

FIG. 3 shows an initial setting operation flow of the tire mounting position detection system 100. As shown in FIG. 3, first, the basic configuration of the vehicle 10 on which the tire mounting position detection system 100 is equipped is set. Specifically, the axle configuration of the vehicle 10 is set (S 10). The axle configuration includes information such as the number of axles of the vehicle 10, the presence or absence of double tires, and the number of tires.

Next, on the basis of the number and positions of the receivers arranged in the vehicle 10, an initial setting is executed on the basis of the received signal strength of the radio signal transmitted from each wheel position (S 20).

Specifically, the standard signal strength from each wheel position is set based on the received signal strength of the radio signal transmitted from each wheel position. In particular, since the signal strength varies greatly according to the vehicle body structure of the vehicle 10 and the type, size, and position of the mounted parts (e.g., fuel tanks), the standard signal strength in each region is adjusted in consideration of such a propagation environment.

The initial setting of the signal strength as described above is repeated for the number of wheels, and the setting is completed (S 30).

(3.2) Tire (Sensor) Position Detecting Operation

Figure 4:
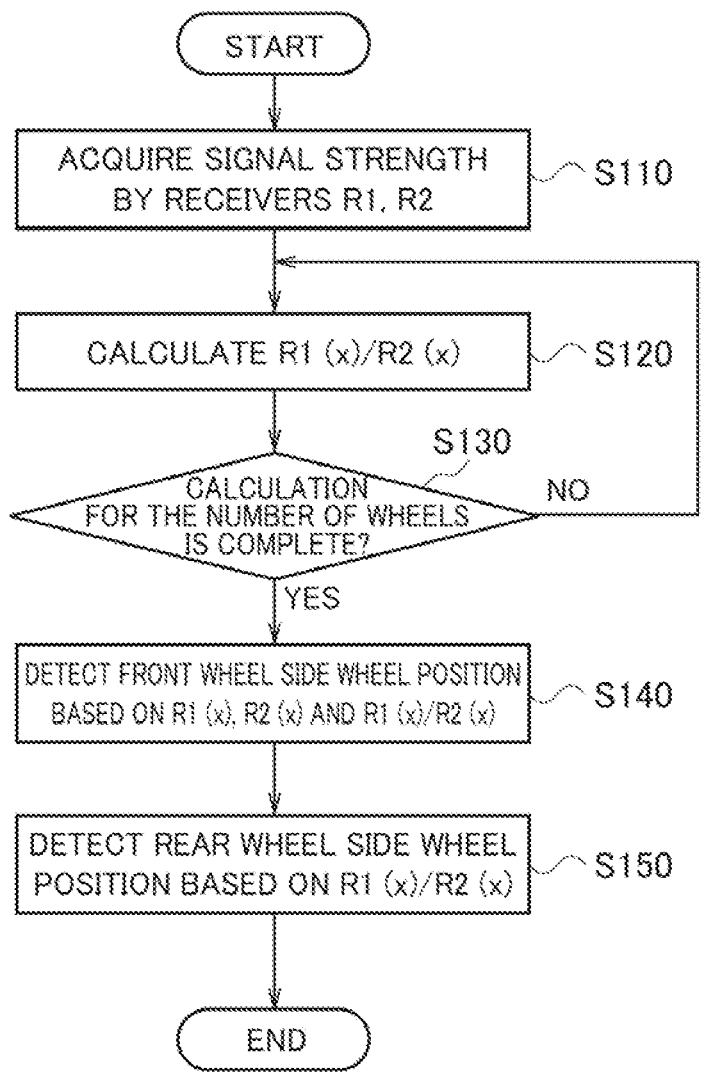
FIG. 4 is a diagram illustrating the detection operation flow of a tire (Sensor) position by the tire mounting position detection system 100.

FIG. 4 shows a detection operation flow of a tire (Sensor) position by the tire mounting position detection system 100. As shown in FIG. 4, the tire mounting position detection system 100 acquires the signal strength of the radio signals from the sensors received by the receiver R1 and the receiver R2 (S 110).

The tire mounting position detection system 100 calculates a quotient (R1/R2) as a strength ratio between the signal strength of the radio signal received by R1 and the signal strength of the radio signal received by R2 for each sensor (S 120). Here, the strength ratio (quotient) is expressed as R1 (x)/R2 (x) (As noted above, "x" is the sensor ID). The tire mounting position detection system 100 repeats the calculation of the strength ratio for the number of wheels (S 130).

Figures 5, 6:
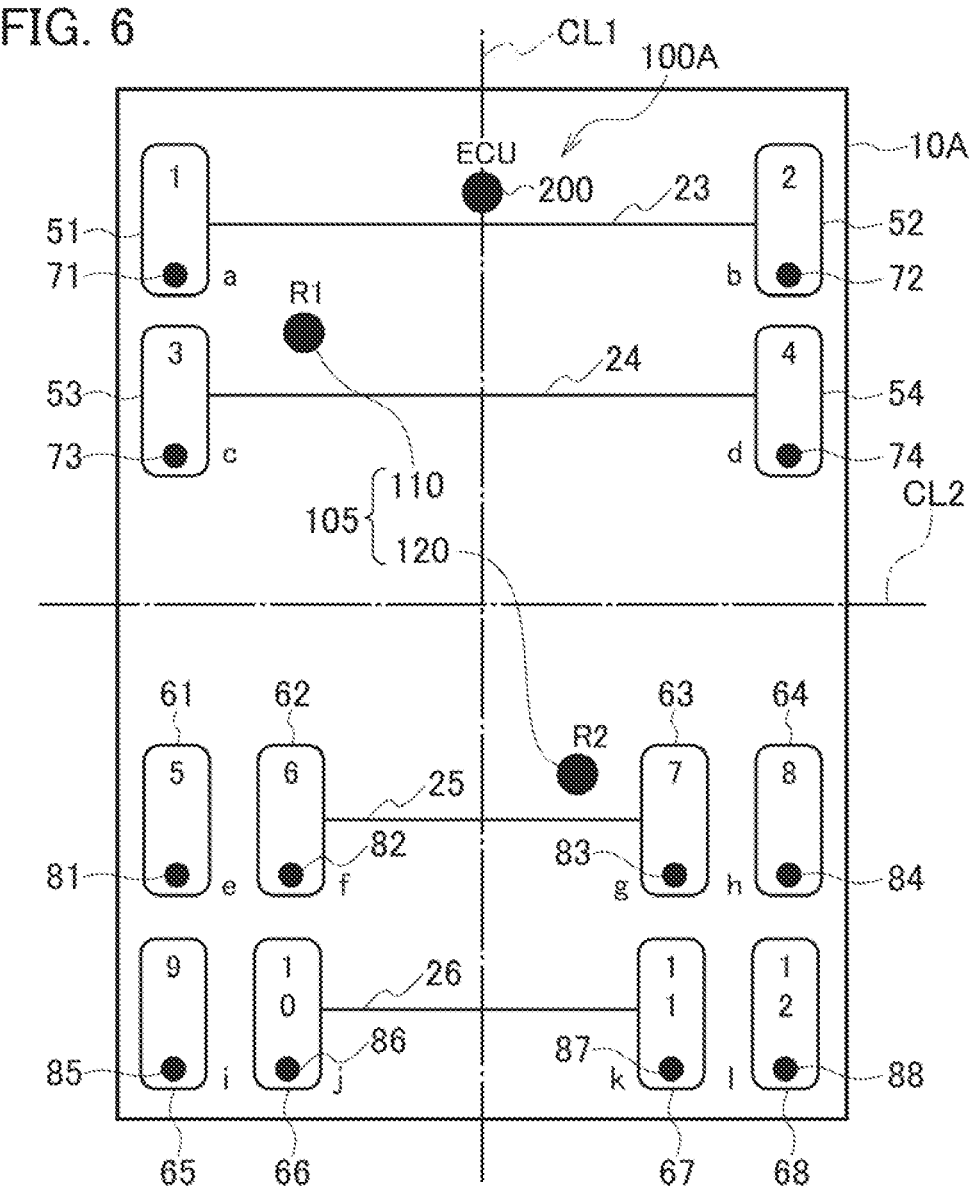
FIG. 5 is a diagram illustrating an example of the strength and computational results of the radio signal measured by the tire mounting position detection system 100.
FIG. 6 is a schematic plan view of a vehicle 10 A including a tire mounting position detection system 100 A.

FIG. 5 shows an example of the strength of the radio signal measured by the tire mounting position detection system 100 and the calculation result. The "Position" shown in FIG. 5 indicates the wheel position of each sensor (Tire) detected by the tire mounting position detection system 100 as a result of the operation shown in FIG. 4.

As shown in FIG. 5, the tire mounting position detection system 100 acquires the measured calculation results of R1 (x), R2 (x), and R1 (x)/R2 (x).

The tire mounting position detection system 100 detects a wheel position (Position) where a tire equipped with the sensor is mounted on the basis of R1 (x), R2 (x) and R1 (x)/R2 (x) (S 140).

Specifically, the tire mounting position detection system 100 first detects the wheel position on the front wheel side based on R1 (x), R2 (x) and R1 (x)/R2 (x).

Of R1 (x) and R2 (x), since the sensor 42 (ID=b) is closest to R1, R1 (b) is the largest. On the other hand, since the sensor 42 (ID=b) is farthest from the receiver 120 (R2), R2 (b) is the smallest.

Therefore, the tire mounting position detection system 100 detects when the sensor 42 (ID=b) having the largest R1 (x)/R2 (x) is located at the position "2".

As shown in FIG. 5, the quotients of the sensor 43 (ID=c), the sensor 44 (ID=d), the sensor 45 (ID=e), and the sensor 46 (ID=f), specifically, R1 (c)/R2 (c) and R1 (d)/R2 (d), and R1 (e)/R2 (e) and R1 (f)/R2 (f), show close values. The reason why the value of R1 (x)/R2 (x) is so close is that the sensor 43 to the sensor 46 are positioned on one of the double tires (inner and outer rear wheels) on the rear wheel side.

On the other hand, the sensor 42 (ID=b) positioned at the front right wheel instead of the double tire can also be detected from such a determination result when it is positioned at the position "2". As for the sensor 41 (ID=a), as a result of detecting that it is located in either of the double tire on the right front wheel side and the rear wheel side, it can be detected when it is located in the remaining position "1".

The tire mounting position detection system 100 determines that the sensor 43 to the sensor 46 (ID=c-f) are positioned on one of double tires (inner and outer rear wheels) on a rear wheel side, and detects a wheel position on the rear wheel side based on the magnitude of R1 (x)/R2 (x) of the sensor (S 150).

Specifically, when the sizes of R1 (c)/R2 (c), R1 (d)/R2 (d), and R1 (e)/R2 (e), R1 (f)/R2 (f) are compared, R1 (c)/R2 (c), R1 (d)/R2 (d) is smaller than R1 (e)/R2 (e), R1 (f)/R2 (f). This is because the sensor 43 (ID=c) and the sensor 44 (ID=d) are closer to R2 than the sensor 45 (ID=e) and the sensor 46 (ID=f), and the values of R2 (c) and R2 (d) are larger.

That is, of the sensors 43 to 46 (ID=c-f), the sensor 43 (ID=c) having a small R1 (x)/R2 (x) and the sensor 44 (ID=d) can be detected when they are located at any of the positions "3" and "4".

Further, the tire mounting position detection system 100 determines whether the sensor 43 (ID=c) and the sensor 44 (ID=d) are located at a position "3" or "4". Specifically, since the sensor 44 (ID=d) is slightly closer to R1 than the sensor 43 (ID=c), R1 (c)<R1 (d) is obtained.

Therefore, R1 (c)/R2 (c) of the sensor 43 (ID=c) becomes smaller than R1 (d)/R2 (d) of the sensor 44 (ID=d) closer to R1.

That is, by comparing R1 (c)/R2 (c) with R1 (d)/R2 (d), it is possible to detect which of positions "3" and "4" is located, i.e. which of the inner rear wheel and the outer rear wheel of the double tire is located.

The same applies to the sensor 45 (ID=e) and the sensor 46 (ID=f), and since the sensor 45 (ID=e) is slightly closer to R2 than the sensor 46 (ID=f), R2 (e)>R2 (f) is obtained. Therefore, R1 (e)/R2 (e) of the sensor 45 (ID=e) closer to R2 is smaller than R1 (f)/R2 (f) of the sensor 46 (ID=f).

That is, by comparing R1 (e)/R2 (e) with R1 (f)/R2 (f), it is possible to detect which of positions "5" and "6" is located, i.e. which of the inner rear wheel and the outer rear wheel of the double tire is located.

(4) Functions and Effects

According to the embodiment described above, the following effects can be obtained. Specifically, according to the tire mounting position detection system 100, the position of the wheel on which the tire equipped with sensor is mounted is detected based on the first signal strength (R1 (x)), which is the strength of the radio signal from the sensor (Transmitter) received by the receiver 110, the second signal strength (R2 (x)), which is the strength of the radio signal from the sensor (Transmitter) received by the receiver 120 arranged at a position different from the receiver 110 in the vehicle longitudinal direction and the vehicle width direction, and the strength ratio between R1 (x) and R2 (x), specifically, the quotient (R1 (x)/R2 (x)).

Thus, the position of the wheel on which the tire (Sensor) is mounted can be automatically detected based only on the reception state of the radio signal transmitted from the sensor. In other words, a sensor for detecting the rotational direction of the tire is not required in order to detect the position of the wheel on which each tire is mounted. Therefore, an increase in the cost and the failure rate of the system can be avoided.

In particular, since the values of R1 (x) and R2 (x) are made dimensionless by using the strength ratio, the position of the wheel on which the tire equipped with the sensor is mounted can be accurately detected even if the performance of the sensor (Transmitter) or the receiver varies.

For sensors, transmission power may not match, and for receivers, reception sensitivity may not match. Even in such a case, by using R1 (x)/R2 (x), the wheel position can be detected in a state in which the variation is canceled even if there is a variation in the measured signal strength.

That is, according to the tire mounting position detection system 100, the position of the wheel on which the tire (Sensor) is mounted can be automatically detected based only on the reception state of the radio signal transmitted from the sensor, especially even when the dispersion of the transmission power or the reception sensitivity of the receiver is low.

In this embodiment, the receiver 110 is disposed on one side with the center line CL2 as a reference (front wheel side), and the receiver 120 is disposed on the other side with the center line CL2 as a reference (rear wheel side). In the present embodiment, the receiver 110 is disposed on one side with the center line CL1 as a reference (right side of the wheel), and the receiver 120 is disposed on the other side with the center line CL1 as a reference (Left side of the wheel).

That is, the receiver 110 and the receiver 120 are arranged diagonally in the 4 areas divided by the center line CL1 and the center line CL2. Therefore, the difference between the values of R1 (x)/R2 (x) according to the wheel position (size) becomes significant, and the wheel position on which the tire equipped with the sensor is mounted is more accurately detected.

In the present embodiment, the tire mounting position detection system 100 detects a wheel position in a rear wheel axle having a double tire configuration based on the strength ratio (quotient). By using the strength ratio, more specifically, R1 (x)/R2 (x), the position of the wheel on which the tire equipped with the sensor is mounted can be accurately detected even when the inner rear wheel and the outer rear wheel are close to each other in the vehicle width direction like a double tire.

Second Embodiment

In this embodiment, the configuration of the vehicle is different from that of the first embodiment. Hereinafter, the parts different from the first embodiment will be mainly described, and the description of the same parts will be omitted as appropriate.

(1) Schematic Structure of Vehicle Including Tire Mounting Position Detection System FIG. 6 is a schematic plan view of a vehicle 10 A including a tire mounting position detection system 10 A. As shown in FIG. 6, the vehicle 10 A is an automobile having a plurality of front wheel axles and a plurality of rear wheel axles. Specifically, the vehicle 10 A includes a front wheel axle 23 and a front wheel axle 24. The vehicle 10 A includes a rear wheel axle 25 and a rear wheel axle 26.

The type of the vehicle 10 A is not particularly limited, but the rear wheel axle 25 and the rear wheel axle 26 have a double tire configuration, and are mainly assumed to be a large truck.

The vehicle 10 A has a 12 wheel configuration. Specifically, the vehicle 10 A is mounted with tires 51 to 54 on the front wheel axle side. The vehicle 10 A is mounted with a tire 61 to a tire 68 on a rear wheel axle side.

The tires 51 to 54 are respectively equipped with sensors 71 to 74, and the tires 61 to 68 are respectively equipped with sensors 81 to 88. The sensors 71 to 74 are assigned "a" to "d" as sensor IDs, respectively. Each of the sensors 81 to 88 is assigned a sensor ID of "e" to "l".

The tire mounting position detection system 100 A includes a receiver 110 and a receiver 120 similar to the tire mounting position detection system 100. Also, in this embodiment, the receiver 120 is disposed at a position different from the receiver 110 in the vehicle longitudinal direction and the vehicle width direction.

Specifically, in this embodiment, the receiver 110 is disposed in a region on the left front side defined by the center line CL1 and the center line CL2. On the other hand, the receiver 120 is disposed in the right rear region.

(2) Function Block Configuration of Tire Mounting Position Detection System

The tire mounting position detection system 100 A, like the tire mounting position detection system 100, includes a position detection device 200. The functional block configuration of the position detection device 200 is the same as that of the 1st embodiment (See FIG. 2).

In the present embodiment, the signal strength calculation unit 230 calculates the sum of the strength (first signal strength) of the radio signal received by the receiver 110 and the strength (second signal strength) of the radio signal received by the receiver 120 for each sensor. In the present embodiment, the signal strength calculation unit 230 constitutes the calculation unit.

More specifically, the signal strength calculation unit 230 calculates the sum of the following signal strengths (R1+R2).

$$R1(a)+R2(a)$$

$$R1(b)+R2(b)$$

$$R1(c)+R2(c)$$

$$R1(d)+R2(d)$$

$$R1(e)+R2(e)$$

$$R1(f)+R2(f)$$

$$R1(g)+R2(g)$$

$$R1(h)+R2(h)$$

$$R1(i)+R2(i)$$

$$R1(j)+R2(j)$$

$$R1(k)+R2(k)$$

$$R1(l)+R2(l) \qquad \text{[Formula 2]}$$

The position detection unit 250 detects a wheel position where the tire equipped with the sensor is mounted on the basis of the first signal strength, the second signal strength, the strength ratio and the total value (sum).

Specifically, the position detection unit 250 uses the signal strength (R1 (x), R2 (x)), the strength ratio (R1 (x)/R2 (x)), and the total value (R1 (x)+R2 (x)) for each sensor to detect the wheel position (Position) on which the tire equipped with each sensor is mounted in a stepwise manner.

More specifically, based on the magnitudes of R1 (x)/R2 (x) and R1 (x)+R2 (x), the position detection unit 250 classifies the 12 wheel tires into a plurality of groups (Positions "1"-"4", "5"-"8" and "9"-"12") associated with the wheel positions. Further, the position detection unit 250 detects the wheel position in each group based on the magnitudes of R1 (x)/R2 (x) and R1 (x)+R2 (x).

A more specific method of detecting the wheel position will be described later.

(3) Operation of the Tire Mounting Position Detection System

Next, the operation of the tire mounting position detection system 100 A will be described. Specifically, the tire (Sensor) position detecting operation of the tire mounting position detecting system 100 A will be described.

Figure 7:
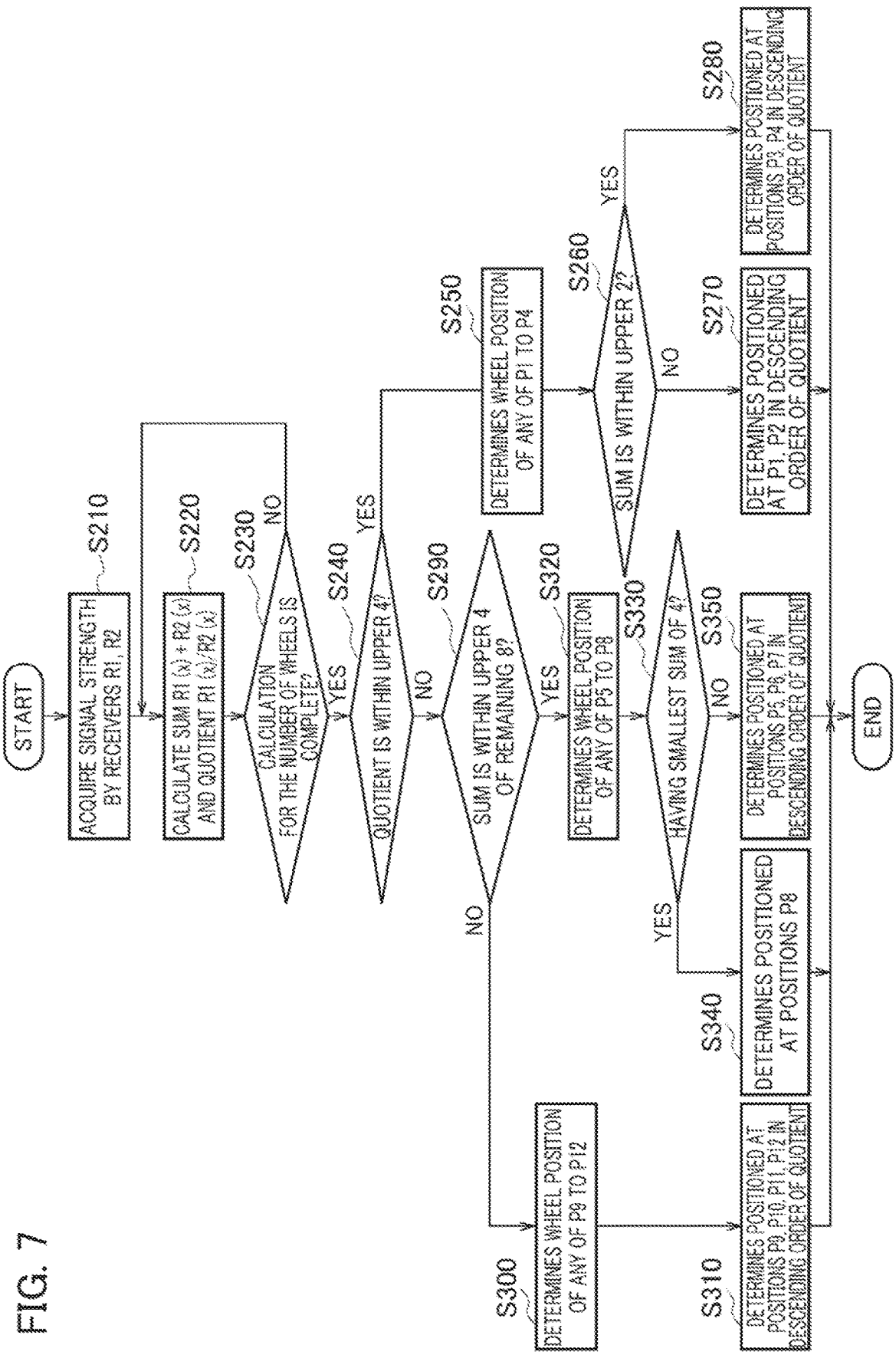
FIG. 7 is a diagram illustrating an operational flow of the tire mounting position detection system 100 A for detecting a tire (Sensor) position.

FIG. 7 shows a detection operation flow of a tire (Sensor) position by the tire mounting position detection system 100 A. As shown in FIG. 7, the tire mounting position detection system 100 A acquires signal strengths of radio signals from the sensors received by the receiver R1 and the receiver R2 (S 210).

Next, the tire mounting position detection system 100 A calculates a total value (sum) and a strength ratio (quotient) using the acquired signal intensities of the respective sensors (S 220). Specifically, the tire mounting position detection system 100 A calculates R1 (x)+R2 (x) and R1 (x)/R2 (x).

FIG. 8 shows an example of the strength of the radio signal measured by the tire mounting position detection system 100 A and the calculation result. The "Position" shown in FIG. 8 shows the wheel positions of the sensors (Tire) detected by the tire mounting position detection system 100 A as a result of the operation shown in FIG. 7.

As shown in FIG. 8, the tire mounting position detection system 100 A acquires the measured calculation results of R1 (x), R2 (x), R1 (x)+R2 (x), and R1 (x)/R2 (x).

The tire mounting position detection system 100 A repeats the calculation of the total value (sum) and the strength ratio (quotient) for the number of wheels (S 230).

Next, the tire mounting position detection system 100 A determines whether or not the magnitude of R1 (x)/R2 (x) of each sensor is within the upper 4 (S 240).

If the magnitude of the quotient (R1 (x)/R2 (x)) is within the upper 4, the tire mounting position detection system 100 A determines that the sensor is positioned at a wheel position of any of positions "1" to "4" (In FIG. 7, P1 to P4, same as below) (S 250).

Further, the tire mounting position detection system 100 A determines whether the sum (R1 (x)+R2 (x)) of the 4 sensors is within the upper 2 or not (S 260).

When the sum (R1 (x)+R2 (x)) is not within the upper 2, that is, when the sum is the lower 2, the tire mounting position detection system 100 A determines that the sensor is positioned at positions "1" and "2" in descending order of the quotient (R1 (x)/R2 (x)) (S 270).

When the sum (R1 (x)+R2 (x)) is within the upper 2, the tire mounting position detection system 100 A determines that the sensor is positioned at positions "3" and "4" in descending order of the quotient (R1 (x)/R2 (x)) (S 280).

FIG. 9 shows an example of the strength of the radio signal and the calculation result similar to FIG. 8, but corresponds to a state in which the processing up to step 280 is completed and the sensors positioned at positions "1" to "4" are detected (Refer to shaded part in the figure).

As shown in FIG. 9, only the sensors 71 (ID=a) to 74 (ID=d) have a quotient (R1 (x)/R2 (x)) greater than 1.0. This is because the sensor 71 to the sensor 74 (In the following description, sensors a to d are used for convenience) only, of the 12 sensors, R1 (x)>R2 (x) is closer to R1 than R2. By utilizing such characteristics, it can be determined that the sensors a to d are located at any one of positions "1" to "4" among the 12 sensors.

Focusing on the sum of the sensors a to d (R1 (x)+R2 (x)), as shown in FIG. 9, the sum of the sensors c and d is larger than the sum of the sensors a and b. This is because the sensors c and d (Tires 73, 74) are located on the front wheel axle 24 closer to R2, and R2 (c) and R2 (d) become larger.

Thus, the sensors located on the front wheel axle 23 and the front wheel axle 24 can be determined.

Next, in each of the sensors a and b determined to be located on the front wheel axle 23 side and the sensors c and d determined to be located on the front wheel axle 24 side, it may be determined that a sensor having a large quotient is mounted on the left wheel of the vehicle 10 A. This is because it is close to R1 and R1 (x) becomes large.

Further, the tire mounting position detection system 100 A determines whether or not the sum (R1 (x)+R2 (x)) of the remaining 8 sensors excluding the aforementioned R1 (x)/R2 (x) having the magnitude of the upper 4 sensors (Sensors a-d) is within the upper 4 sensors (S 290).

Of the remaining 8 sensors (sensors e-l), when the sum (R1 (x)+R2 (x)) is not within the upper 4, that is, when the sum is the lower 4, the tire mounting position detection system 100 A determines that the sensor is located at a wheel position of any of the positions "9" to "12" (S 300).

Furthermore, the tire mounting position detection system 100 A determines that the 4 sensors are positioned at positions "9", "10", "11", and "12" in descending order of the quotient (R1 (x)/R2 (x)) (S 310).

FIG. 10 corresponds to a state in which the processing up to step 310 is completed and sensors positioned at positions "9" to "12" are detected (Refer to the detailed shaded part in the figure). As shown in FIG. 10, of the sensors e-l, the sensors whose sum (R1 (x)+R2 (x)) is the lower 4 are the sensors i-l. This is because sensors i-l are far from both R1 and R2. Thus, it can be determined that the sensors i to l are located at any of the positions "9" to "12".

Focusing on the quotients (R1 (x)/R2 (x)) of the sensors i to l, as shown in FIG. 10, the sensor i is the largest, and smaller in the order of the sensors j, k, l. This is because R1 (x) and R2 (x) basically depend on the distance between R1, R2 and the sensor, and the distance difference between the sensor and R1 and between the sensor and R2 is large in the order of the sensors i, j, k, l.

Of the remaining 8 sensors (sensors e-l), if the sum (R1 (x)+R2 (x)) is within the upper 4, the tire mounting position detection system 100 A determines that the sensor is located at a wheel position of any of the positions "5" to "8" (S 320). The reason why it can be determined that the sensor is located at any of the wheel positions "5" to "8" is the same as the determination of the sensor located at the positions "9" to "12" described above, because the sensor located at the positions "5" to "8" is close to both R1 and R2 and the sum (R1 (x)+R2 (x)) becomes large.

Further, the tire mounting position detection system 100 A determines that, of the 4 sensors, the sensor (R1 (x)+R2 (x)) having the smallest sum (Sensor h) is located at the position "8" (S 330, S 340).

FIG. 11 corresponds to a state in which the processing up to step 340 is completed and the sensor positioned at the position "8" is detected (Refer to the detailed shaded part in the figure).

As with the positions "9" to "12" described above, for the positions "5" to "8", the position where each sensor is located may be determined using only the quotient (R1 (x)/R2 (x)), but depending on the structure of the vehicle 10 A or the like, it is assumed that the propagation environment is different depending on the wheel position and the position is erroneously detected.

In the example shown in FIG. 11, when the position where each sensor is located is determined using only the quotient (R1 (x)/R2 (x)), the position of the sensor g and the position of the sensor h are reversed. In the case where the position in the vehicle width direction (lateral direction) cannot be determined by the quotient alone due to the structure of the vehicle 10 A or the like, attention should be paid to the sum (R1 (x)+R2 (x)) first.

The sensor with the minimum sum (R1 (x)+R2 (x)) can be determined to be located at the position farthest from both R1 and R2, specifically at the position where the total distance between the sensors and R1 and between the sensors and R2 is greatest, i.e., at position "8".

The tire mounting position detection system 100 A determines that among the 4 sensors, the 3 sensors excluding the sensor (Sensor h) having the minimum sum (R1 (x)+R2 (x)) are positioned at positions "5", "6", and "7" in descending order of the quotient (R1 (x)/R2 (x)) (S 350).

FIG. 12 corresponds to a state in which all the processes up to step 350 are completed and sensors positioned at positions "5", "6", and "7" are detected (Refer to the detailed shaded part in the figure).

As shown in FIG. 12, when looking at the quotients (R1 (x)/R2 (x)) of the sensors e to g, the sensor e is the largest and the sensors f and g are smaller in this order. This is because R1 (x) and R2 (x) basically depend on the distance between R1, R2 and the sensor, and the distance difference between the sensor and R1 and between the sensor and R2 is large in the order of sensors e, f and g.

(4) Function and Effects

According to the tire mounting position detection system 100 A according to the present embodiment, in addition to R1 (x), R2 (x) and R1 (x)/R2 (x), the wheel position on which the tire equipped with sensor is mounted is detected based on the sum (R1 (x)+R2 (x)).

Therefore, as described above, even when the propagation environment varies depending on the wheel position due to the structure of the vehicle 10 A or the like, and the wheel position is erroneously detected only by R1 (x)/R2 (x), the wheel position on which the tire equipped with the sensor is mounted can be accurately detected by supplementarlly and flexibly using the sum (R1 (x)+R2 (x)).

Other Embodiments

While the contents of the present invention have been described in accordance with the above embodiments, it will be apparent to those skilled in the art that the present invention is not limited to these descriptions and that various modifications and improvements are possible.

For example, in the above-described embodiment, the position detection device 200 is incorporated as a part of an electronic control unit (ECU) mounted on the vehicle 10, but it may be modified as follows.

Figure 13:
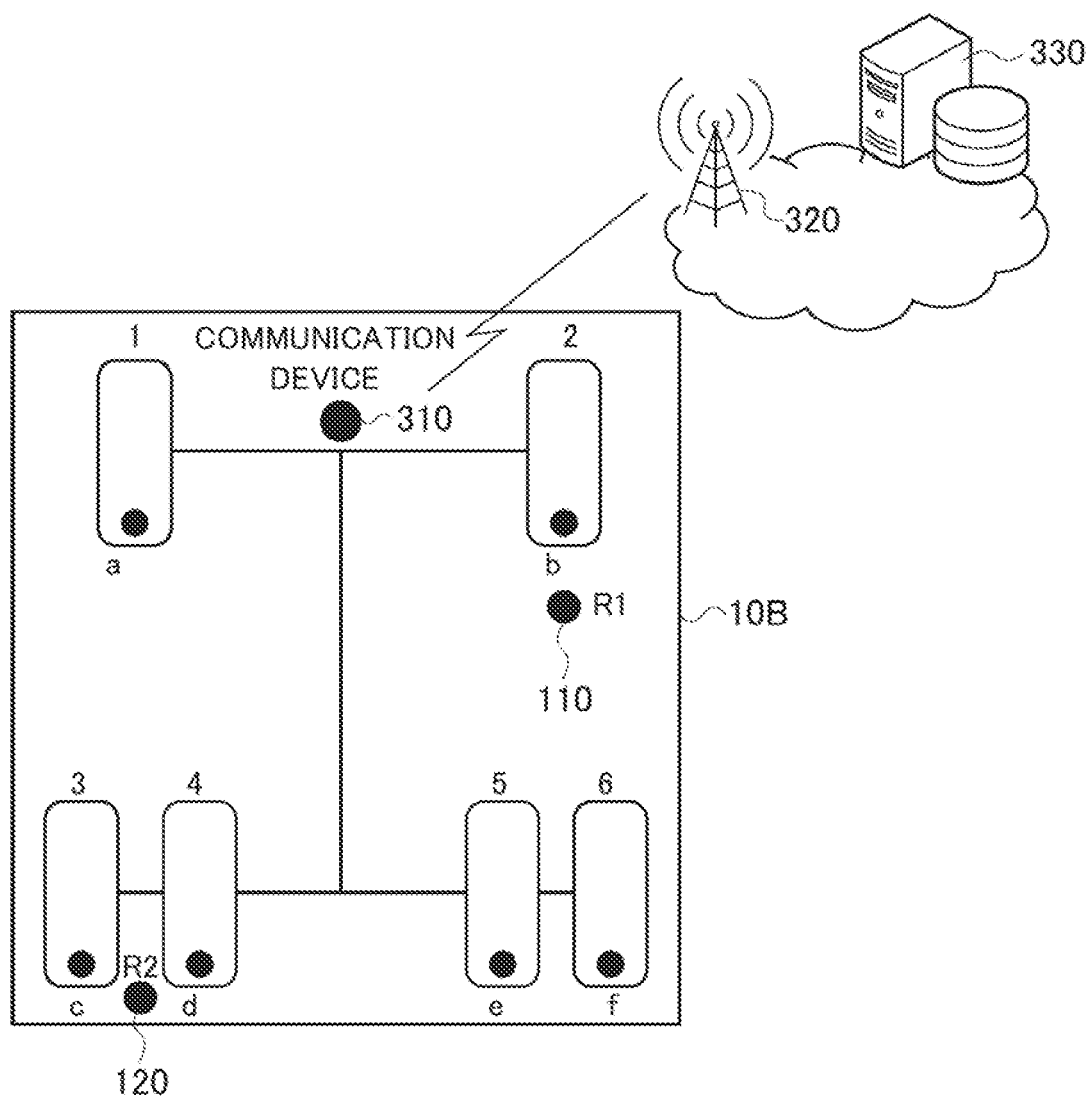
FIG. 13 is a schematic plan view and schematic network diagram of a vehicle 10 B according to another embodiment.

FIG. 13 is a schematic plan view and a schematic network configuration view of a vehicle 10 B according to another embodiment. As shown in FIG. 13, the vehicle 10 B includes a communication device 310 instead of the position detection device 200.

The communication device 310 may perform wireless communication with a wireless base station 320. The communication device 310 is, for example, a wireless communication terminal connectable to a mobile communication network (LTE, etc.).

The server computer 330 is provided on a communication network and realizes functions (first measurement unit 210, second measurement unit 220, signal strength calculation unit 230, and position detection unit 250) that have been realized by the position detection device 200.

The program (software, which may be called a program product) for realizing the function may be stored in a state capable of downloading on the communication network or may be provided in a form stored in a storage medium.

In the initial setting operation shown in FIG. 3 or the like, it may be automatically determined whether or not the tire is mounted on the vehicle (Sensor). For example, the sensor ID of each sensor (Transmitter) may be monitored over a certain period of time, and the sensor having the large number of times of reception may be determined as a tire (Sensor) mounted on the own vehicle.

REFERENCE SIGNS LIST 10, 10 A, 10 B vehicles
21, 23 and 24 front wheel axle
22, 25 and 26 rear wheel axles
31-36 tires
41-46 Sensors
51-54 tires
61-68 tires
71-74 Sensors
81-88 Sensors
100, 100 A tire mounting position detection system
105 receiving unit
110, 120 receivers
200 position Detection Device
210 first measurement unit
220 second measurement unit
230 signal strength calculation unit
250 position detection unit
310 communication device
320 wireless base station
330 server computer

The invention claimed is:

1. A tire mounting position detection system for detecting at which wheel position of a vehicle each tire equipped with a transmitter is mounted, including a receiving unit disposed in the vehicle and for receiving a radio signal transmitted from the transmitter; wherein:
the receiving unit includes:
a first receiver; and
a second receiver disposed at a position different from the first receiver in the vehicle longitudinal direction and the vehicle width direction; and the tire mounting position detection system comprising:
a first measurement unit for measuring a first signal strength, which is strength of the radio signal received by the first receiver, for each transmitter;
a second measurement unit for measuring a second signal strength, which is strength of the radio signal received by the second receiver, for each transmitter;
a calculation unit for calculating an strength ratio, which is a ratio using the first signal strength and the second signal strength, for each transmitter; and
a position detection unit for detecting a wheel position on which a tire equipped with the transmitter is mounted, based on the first signal strength, the second signal strength, and the strength ratio for each transmitter.

2. The tire mounting position detection system according to claim 1, wherein
the calculation unit calculates a total value of the first signal strength and the second signal strength for each transmitter; and
wherein the position detection unit detects the wheel position based on the first signal strength, the second signal strength, the strength ratio, and the total value.

3. The tire mounting position detection system according to claim 2, wherein
the first receiver is disposed on one side of a longitudinal center line between a front wheel and a rear wheel as a reference,
the second receiver is disposed on the other side with respect to the longitudinal center line.

4. The tire mounting position detection system according to claim 2, wherein
the first receiver is disposed on one side of a widthwise center line between a left wheel and a right wheel, and
the second receiver is disposed on the other side of the widthwise center line.

5. The tire mounting position detection system according to claim 2, wherein
a rear wheel axle of the vehicle has a double tire configuration; and
the position detection unit detects the wheel position in the rear wheel axle based on the strength ratio.

6. The tire mounting position detection system according to claim 1, wherein
the first receiver is disposed on one side of a longitudinal center line between a front wheel and a rear wheel as a reference,
the second receiver is disposed on the other side with respect to the longitudinal center line.

7. The tire mounting position detection system according to claim 6, wherein
the first receiver is disposed on one side of a widthwise center line between a left wheel and a right wheel, and
the second receiver is disposed on the other side of the widthwise center line.

8. The tire mounting position detection system according to claim 6, wherein
a rear wheel axle of the vehicle has a double tire configuration; and
the position detection unit detects the wheel position in the rear wheel axle based on the strength ratio.

9. The tire mounting position detection system according to claim 1, wherein
the first receiver is disposed on one side of a widthwise center line between a left wheel and a right wheel, and
the second receiver is disposed on the other side of the widthwise center line.

10. The tire mounting position detection system according to claim 9, wherein
a rear wheel axle of the vehicle has a double tire configuration; and
the position detection unit detects the wheel position in the rear wheel axle based on the strength ratio.

11. The tire mounting position detection system according to claim 1, wherein
a rear wheel axle of the vehicle has a double tire configuration; and
the position detection unit detects the wheel position in the rear wheel axle based on the strength ratio.

12. A tire mounting position detecting method for detecting at which wheel position of a vehicle each tire mounted with a transmitter is mounted, including a receiving unit is disposed in the vehicle and receives a radio signal transmitted from the transmitter; wherein
the receiving unit includes a first receiver and a second receiver disposed at a position different from the first receiver in the vehicle longitudinal direction and the vehicle width direction, and the tire mounting position detecting method comprising the steps of:
measuring a first signal strength, which is the strength of the radio signal received by the first receiver, for each transmitter;
measuring a second signal strength, which is the strength of the radio signal received by the second receiver, for each transmitter;
calculating an strength ratio, which is a ratio using the first signal strength and the second signal strength, for each transmitter; and
detecting a position of a wheel on which a tire equipped with the transmitter is mounted, based on the first signal strength, the second signal strength, and the strength ratio for each transmitter.

13. A tire mounting position detection non-transitory program product for detecting at which wheel position of a vehicle each tire mounted with a transmitter is mounted, including a receiving unit is disposed in the vehicle and receives a radio signal transmitted from the transmitter; wherein the receiving unit includes a first receiver and a second receiver disposed at a position different from the first receiver in the vehicle longitudinal direction and the vehicle width direction; the tire mounting position detection program causing a computer to execute: a process of measuring a first signal strength, which is the strength of the radio signal received by the first receiver, for each transmitter; a process of measuring a second signal strength, which is the strength of the radio signal received by the second receiver, for each transmitter; a process of calculating an strength ratio, which is a ratio using the first signal strength and the second signal strength, for each transmitter; and a process of detecting a position of a wheel on which a tire equipped with the transmitter is mounted is mounted, based on the first signal strength, the second signal strength, and the strength ratio for each transmitter.

* * * * *